Patented Apr. 13, 1954

2,675,377

UNITED STATES PATENT OFFICE 2,675,377

METHOD OF PREPARING SULFURIC ACID ESTERS OF CELLULOSE

Carl J. Malm and Carlton L. Crane, Rochester, N. Y., assignors to Eastman Kodak Company, Rochester, N. Y., a corporation of New Jersey No Drawing. Application January 18, 1951, Serial No. 206,728

6 Claims. (Cl. 260—215)

This invention relates to a method of preparing sulfuric acid esters of cellulose in which sulfur dioxide diluent is employed in the esterification bath.

Water-soluble cellulose derivatives have been of considerable interest in recent years. For instance, U. S. Patent 2,129,052 of Fordyce discloses the preparation of water-soluble cellulose acetates. U. S. Patent 2,093,463 of Malm and Waring refers to the sodium salt of cellulose acetate phthalate which is water soluble. U. S. Patent 2,232,990 of Yackel and Kenyon discloses a method of preparing water-soluble cellulose derivatives by oxidizing cellulose with $NO_2$ and then preparing the sodium salt thereof.

In our U. S. Patent No. 2,539,451, dated January 30, 1951, a method of preparing sulfuric acid esters of cellulose was described in which ammonium sulfate was employed in the esterification bath. The present invention also relates to a method of preparing sulfuric acid esters of cellulose from which water-soluble salts may be made. One object of our invention is to provide a method for preparing sulfuric acid esters of cellulose in which the original fibrous form of the cellulose is readily retained. Another object of our invention is to provide a method in which products having high viscosity are easily prepared even using large-scale operations. A further object of our invention is to provide a method for preparing sulfuric acid esters of cellulose in which sulfur dioxide is used as the diluent therein. A still further object of our invention is to provide a method of preparing sulfuric acid esters of cellulose in which methanol may be employed as part of the esterification bath either alone or mixed with a higher alcohol. Other objects of our invention will appear herein.

In the large-scale production of sulfuric acid esters of cellulose, considerable heat is generated and even with the use of large volumes of ordinary diluents, control of the reaction is sometimes difficult because of the excessive amount of heat which must be removed from the reaction. In the sulfation of cellulose, the product goes through a swollen or very soft stage just prior to and at the end of the reaction, and during the primary purification steps this soft product may become highly compacted, whereby the original fibrous form of the cellulose may not be retained. Often extended agitation in alcohol is required to disperse the hardened lumps so formed to a point that the acid which has been entrained therein can be neutralized. We have found, however, that by using liquid sulfur dioxide as a diluent in making sulfuric acid esters of cellulose, products having a high viscosity can be readily prepared, the sulfur dioxide functioning not only as a diluent but also to provide a temperature control whereby the original fibrous form of the cellulose is easily retained.

In its broadest aspects, our invention comprises the treatment of cellulose with a mixture of alcohol of 1–5 carbon atoms, sulfuric acid, and a large proportion of liquid sulfur dioxide which acts to dilute the mass. The preparation of cellulose sulfate in accordance with our invention is carried out by, first, mixing the sulfuric acid, some of the alcohol and the liquid sulfur dioxide together and to this mass is added the cellulose, particularly after first treating the cellulose with water and dewatering it with an alcohol which may be the same as employed in preparing the reaction mixture. The proportion of sulfuric acid which is employed is less than will cause any appreciable dissolving of the cellulose sulfate in the reaction mass, but is at least sufficient to promote the reaction. It is preferable in carrying out the preparation in accordance with our invention that the temperature be kept below 13° F. although the temperature may be within the range of 0° to 40° F. After the cellulose has been added to the reaction mass, the reaction is run for a sufficient time to give a product which when reacted with an alkali metal compound gives a water-soluble product. Ordinarily, the reaction time occupies from three to seven hours, although this time will vary depending upon the conditions of operation; for instance, when methanol is used, a reaction time of one hour has been found to give water solubility. If a product insoluble in water but alkali-soluble is desired, a shorter reaction time can be employed. It is preferable in carrying out a process in accordance with our invention that the cellulose be first activated by treating with water and then dehydrated with an alcohol. The cellulose employed may be a refined wood pulp or it may be cotton linters of good quality.

The ratio of alcohol to sulfuric acid varies depending upon the alcohol which is used. For instance, if isopropyl alcohol is employed, the proportion of sulfuric acid to alcohol should be 90-75 percent of the former to 10-25 percent of the latter. These proportions also hold true with normal propyl alcohol. When butyl alcohol is employed the proportion of sulfuric acid which will not cause any appreciable dissolving of the cellulose sulfate but which will be at least sufficient to promote the reaction is within the range of 65-80 percent, based on the weight of the mixture of sulfuric acid and alcohol. This holds true either for the normal butyl or isobutyl alcohol. With the alcohols of 5 carbon atoms, such as isoamyl or normal amyl alcohol, the concentrated sulfuric acid should constitute 55-70 percent of the mixture of alcohol and sulfuric acid. With methyl alcohol 85-95 percent of sulfuric acid should be employed in making up the mixture of alcohol and sulfuric acid. Ordinarily, it is desirable that the proportion of alcohol-sulfuric acid mixture to cellulose be 6-12:1. However, an advantage of our process is that smaller ratios than this can be used because of the use of a diluent to add to the proportion of liquid present and hence with good mixing, ratios less than 6:1 such as, 4:1 of alcohol-sulfuric acid mixture to cellulose may be employed.

As regards $SO_2$ to cellulose, a ratio of 15-to-60:1 in the reaction bath is satisfactory. However, in many cases it may be desirable to use much larger proportions of liquid sulfur dioxide to insure control of the reaction so that a temperature rise is avoided. For instance, liquid-to-cellulose ratios of 50-to-75:1 may be employed.

In carrying out the reaction between the cellulose and the sulfating mixture, any type of mixing apparatus which gives adequate agitation can be used. It is desirable to have an outlet provided with a cooling means whereby the gaseous sulfur dioxide is condensed and returned to the reaction vessel by a refluxing operation. If desired, however, the sulfur dioxide can be led off and other liquid sulfur dioxide can be introduced to displace that which has evaporated, if it is thought desirable to operate in that fashion. The agitators employed in the reaction vessel may be propeller stirrers, Sigma Blade stirrers or any type of stirring elements which will give thorough and complete mixing. When the reaction is complete the spent reactants and the liquid sulfur dioxide are removed from the product such as by centrifuging followed by washing with an alcohol such as isopropanol. The following examples illustrate our invention:

Example 1.—111 parts of isopropanol was mixed with 468 parts of 95% sulfuric acid, accompanied by agitation and cooling. The isopropanol was added at a rate such that the temperature of the mixture does not exceed 60° F. When the mixing was completed the mixture was cooled to 10-14° F. and transferred to a jacketed, closed reactor equipped with an agitator and a moisture-trapped condenser. 1900 parts of liquid sulfur dioxide was added to the reactor and the mass was thoroughly mixed. The temperature in the reactor was maintained at 5-14° F. and there was added thereto, over a period of 5 minutes, 71 parts of a mixture consisting of 50 parts of cellulose and 21 parts of 99% isopropanol which mixture was prepared as follows:

Refined cotton linters were slurried in distilled water, boiled for 2 hours, drained and centrifuged as dry as possible. The damp fibers were dehydrated with 3 successive changes of isopropanol and the mass was centrifuged to a 70.5% solids content.

When the addition of the cellulose to the reaction vessel was complete, the reaction temperature was allowed to rise until gentle boiling occurred and the mass was agitated for 5 hours or until the product reaches water solubility. 700 parts of liquid $SO_2$ was added to provide a flowable slurry and the mass was transferred to a centrifuge where the liquids were centrifuged off. The white soft fibrous product thus obtained was slurried in isopropanol. The material was washed in three successive changes of isopropanol and the product obtained was slurried in 20 parts of a 4:1 mixture of isopropanol and distilled water. The pH of the slurry was adjusted with aqueous 20% sodium carbonate until a sample of the product, when dissolved in distilled water gives a pH of 6-7. The product was centrifuged and then dried at 140° F. The material obtained was found to be readily soluble in water and was useful as an emulsifying agent.

Example 2.—In an apparatus similar to that employed in Example 1, 496 parts of 95% sulfuric acid was mixed with 67 parts of isopropanol with agitation and cooling, the isopropanol having been added at such a rate that the temperature did not exceed 60° F.

The mixture was cooled to 5° F. and 4400 parts of liquid sulfur dioxide was added thereto. There was then added to the reaction bath over a period of 5 minutes 137 parts of a mixture consisting of 100 parts of cellulose, 3.16 parts of water, and 38.84 parts of isopropanol, prepared as follows:

Refined cotton linters were slurried in distilled water, boiled for one hour, drained and centrifuged as dry as possible. The fibers were dehydrated with 4 changes of isopropanol and then centrifuged.

After the addition of cellulose to the reaction mass was completed, the reaction temperature was allowed to rise until boiling occurred and the mass was agitated at this temperature for 8⅓ hours. The mass was then transferred to a centrifuge and the excess liquids were centrifuged off. The white fibrous product obtained was washed with 3 changes of isopropanol and then slurried in 20 parts of a 4:1 mixture of isopropanol in distilled water. Aqueous 20% sodium carbonate was added to a point that a sample of the product when dissolved in distilled water gives a pH of 6-7. The product was centrifuged and was then dried at 140° F. The resulting product was found to have a sulfur content of 6.6% and a viscosity at 3% concentration in distilled water of 4613 centipoises.

Example 3.—In an apparatus similar to that used in the preceding examples there was mixed 1020 parts of 95% sulfuric acid and 143 parts of methyl alcohol with cooling and stirring, the methanol being added at a rate that the temperature does not exceed 60° F. The bath was cooled to 5° F. and 3800 parts of liquid sulfur dioxide was added thereto. There was added to the reaction vessel while maintaining at 5° F. over a period of 5 minutes 137 parts of a mixture consisting of 100 parts of cellulose, 3.16 parts of water, and 33.84 parts of isopropanol prepared as described in the preceding example.

When the addition of the cellulose was complete the temperature of the reaction was allowed to rise until boiling ensued and the mass was agitated for 5 hours. The resulting product was centrifuged and washed in 3 successive changes of isopropanol. The white fibrous material was slurried in 20 parts of a 4:1 mixture of isopropanol and distilled water. Aqueous 20% sodium carbonate was added thereto until a sample dissolved in cold water gave a pH of 6. The mass was centrifuged and then dried at 140° F. The product was found to have a sulfur content of 8% and a viscosity at 10% concentration in distilled water at 25° C. of 71.9 centipoises.

*Example 4.*—1080 parts of 95% sulfuric acid was placed in an apparatus such as described above and 112 parts of methyl alcohol was added thereto with cooling and agitation so that the temperature did not exceed 60° F. The mixture was cooled to 5° F. and 3800 parts of liquid sulfur dioxide was added thereto. There was then added 118 parts of a mixture of 100 parts of cellulose, 5 parts of water, and 13 parts of methanol, prepared as follows:

The cellulose fibers were slurried in distilled water and the mixture was boiled for 2 hours. The fibers were centrifuged as dry as possible and dehydrated with 4 changes of methanol and then centrifuged to give the material added above.

After the addition of the cellulose to the reaction mass the temperature was allowed to rise until boiling occurred. After one hour of this reaction the product was centrifuged as dry as possible, washed in isopropanol 3 times, and then slurried in 20 parts of a 4:1 mixture of isopropanol in distilled water (per part of cellulose). Aqueous 20% sodium carbonate was added until a small sample dissolved in distilled water gave a pH of 6. The product was centrifuged and then dried at 140° F. It was found to have a sulfur content of 8% and a viscosity at 2% concentration in distilled water at 25° C. or 8.6 centipoises.

*Example 5.*—4400 parts of liquid sulfur dioxide were placed in a jacketed tumbler-type autoclave and cooled to 5° F. A cooled mixture consisting of 11 parts of isopropanol and 498 parts of 95.5% sulfuric acid was added to the autoclave. Refined esterification-grade woodpulp which had been boiled in distilled water for one hour and then dehydrated with successive changes of isopropanol was added in the proportion of 191 parts thereof consisting of 100 parts of pulp, 3 parts of water, and 88 parts of isopropanol. The temperature of the mixture was allowed to rise to 12° F. The mass was tumbled for one hour and the temperature was then reduced to 8° F. The temperature was then allowed to rise to a maximum of 28° F. over 3 hours. The slurry obtained was centrifuged and the product was washed 3 times with isopropanol. The white fibrous ester was slurried in 1000 parts of a 4:1 mixture of isopropanol and distilled water and 10% NaOH was added until a small sample of the product dissolved in distilled water gave a pH of 6.5. The product was centrifuged and then dried at 140° F. The product was found to have a sulfur content of 5.2% and a viscosity in a 2% solution in distilled water at 25° C. of 149 centipoises.

Instead of the sodium salts in each of the examples given, some other alkaline material could be employed to obtain the salt desired. Also, although in the example given isopropanol or methanol is the alcohol employed, any of the alcohols which have been mentioned in the specification might be employed, using, however, the proportions which have been listed as being useful for those alcohols.

What we claim as our invention and desire to secure by Letters Patent of the United States:

1. A method for preparing sulfuric acid esters of cellulose which comprises esterifying cellulose with a bath essentially consisting of alcohol, sulfuric acid and as the diluent thereof liquid sulfur dioxide, the alcohol in the bath being selected from the aliphatic alcohols of 1–5 carbon atoms the proportion of sulfuric acid to alcohol in the bath being 90–55% of the former to 10–45% of the latter, the ratio of alcohol-sulfuric acid to cellulose therein being 6–12:1, and the ratio of liquid sulfur dioxide to cellulose therein being 15–75:1, the sulfuric acid used being in a sufficient amount to promote the reaction but less than will cause appreciable dissolving of sulfuric acid esters of cellulose in the reaction mass, the reaction being carried out at a temperature of 0–40° F. for a sufficient time to give as the product a cellulose sulfate which is soluble in dilute aqueous alkali.

2. A method for preparing sulfuric acid esters of cellulose which comprises esterifying cellulose with a bath essentially consisting of a propyl alcohol, sulfuric acid, and as the diluent thereof, liquid sulfur dioxide, the proportion of sulfuric acid to alcohol in the bath being 90–75% of the former to 10–25% of the latter, and the proportion of alcohol-sulfuric acid to cellulose therein being 6–12:1, the amount of sulfuric acid employed in the bath being less than will cause any appreciable dissolving of sulfuric acid esters of cellulose in the reaction mass but sufficient to promote the reaction and the proportion of liquid sulfur dioxide to cellulose in the bath being within the range of 15–75:1, the reaction being carried out at a temperature of 0–40° F. for a sufficient time to give as the product a cellulose sulfate which is soluble in dilute aqueous alkali.

3. A method for preparing sulfuric acid esters of cellulose which comprises esterifying cellulose with a bath essentially consisting of methyl alcohol, sulfuric acid and as the diluent, liquid sulfur dioxide, the proportion of sulfur to alcohol in the bath being 85–95% of the former to 15–5% of the latter, the proportion of alcohol-sulfuric acid to cellulose therein being 6–12:1, the amount of sulfuric acid employed in the bath being less than will cause appreciable dissolving of sulfuric acid esters of cellulose in the reaction mass but sufficient to promote the reaction and the proportion of liquid sulfur dioxide to cellulose being within the range of 15–75:1, the reaction being carried out at a temperature of 0–40° F. for a sufficient time to give as the product a cellulose sulfate which is soluble in dilute aqueous alkali.

4. A method for preparing sulfuric acid esters of cellulose which comprises esterifying 1 part of cellulose with a bath essentially consisting of approximately 1 part of isopropyl alcohol, approximately 5 parts of sulfuric acid and as the diluent approximately 44 parts of liquid sulfur dioxide, the reaction being carried out at a temperature of 0–40° F. for a sufficient time to give as the product a cellulose sulfate which is soluble in dilute aqueous alkali.

5. A method for preparing sulfuric acid esters of cellulose which comprises esterifying 1 part of cellulose with a bath essentially consisting of approximately ⅓ part of isopropyl alcohol, approximately 1½ parts of methyl alcohol, approximately 10 parts of sulfuric acid and as a diluent approximately 38 parts of liquid sulfur dioxide, the reaction being carried out at a temperature of 0–40° F. for a sufficient time to give as the product a cellulose sulfate which is soluble in dilute aqueous alkali.

6. A method for preparing sulfuric acid esters of cellulose which comprises esterifying 1 part of cellulose with a bath essentially consisting of approximately 1¼ parts of methyl alcohol, approximately 10 parts of sulfuric acid and as the diluent approximately 38 parts of liquid $SO_2$, the reaction being carried out at a temperature of 0–40° F. for a sufficient time to give as the product a cellulose sulfate which is soluble in dilute aqueous alkali.

References Cited in the file of this patent

UNITED STATES PATENTS

| Number | Name | Date |
|---|---|---|
| 2,016,299 | Schulze | Oct. 8, 1935 |
| 2,143,332 | Sindl | Jan. 10, 1939 |
| 2,539,451 | Malm et al. | Jan. 30, 1951 |

FOREIGN PATENTS

| Number | Country | Date |
|---|---|---|
| 448,249 | Belgium | Dec. 5, 1942 |

OTHER REFERENCES

Ross et al., Ind. & Eng. Chem., vol. 34, No. 8, August 1942, pages 924–926.

Groggins, "Unit Processes in Organic Synthesis," 3rd ed., 1947, page 285.